United States Patent [19]

Rocco

[11] 4,065,012
[45] Dec. 27, 1977

[54] LOW LIFT TRUCK

[75] Inventor: Jack O. Rocco, Burlington, Mich.

[73] Assignee: Clark Equipment Company, Buchanan, Mich.

[21] Appl. No.: 673,221

[22] Filed: Apr. 2, 1976

[51] Int. Cl.² .................................................. B60P 1/02
[52] U.S. Cl. ..................... 214/510; 214/514;
 214/701 P; 254/2 R; 280/43.12
[58] Field of Search ................................ 214/670–674,
 214/701, 660, 510, 514; 280/43.12; 254/2 R;
 187/9 R

[56] References Cited

U.S. PATENT DOCUMENTS

| | | | |
|---|---|---|---|
| 3,072,418 | 1/1963 | Becker | 280/43.12 |
| 3,183,989 | 5/1965 | Trusock et al. | 280/43.12 |
| 3,392,858 | 7/1968 | Fernstrom et al. | 214/750 |
| 3,441,287 | 4/1969 | Leonard et al. | 280/43.12 |
| 3,495,730 | 2/1970 | Rigsby | 214/750 |
| 3,625,534 | 12/1971 | Harrison et al. | 280/43.12 |

Primary Examiner—Lawrence J. Oresky
Attorney, Agent, or Firm—John C. Wiessler

[57] ABSTRACT

A powered walkie/rider low lift transporter type truck especially for slip sheet pallet handling in which a tractor portion is supported from a single drive-steer wheel at one end and load wheels at the other end are pivoted from a relatively short length L-shaped platform or frame and are actuatable to lift and lower the platform by actuator-linkage means. A pair of channel members are located intermediate the drive-steer and load wheels having stop members secured therein and camming or open portions formed at the bottom of the rear flanges. A load supporting relatively long L-shaped platform or frame is mounted in the channel members by pairs of upper and lower guide rollers; it overlaps, extends forwardly of and is elevatable in a horizontal plane with the short platform to transport a load. Lowering the short platform effects a forward tilting of the long platform to form a ramp thereof with the floor as the upper guide rollers contact the stop members and the lower guide rollers project into the open portions of the rear flanges while the load wheels project into openings formed in the long platform. A known push-pull device is mounted on the carriage of the long platform for slip sheet pallet handling.

15 Claims, 6 Drawing Figures

LOW LIFT TRUCK

BACKGROUND OF THE INVENTION

The field of art to which the invention pertains includes low lift platform transporter trucks, and more particularly devices adapted for tilting and for elevating a relatively small distance above the floor the load support of a pallet or platform type lift truck.

Various methods and devices for handling material on sheet-like or slip sheet pallets which may be drawn onto a load supporting surface of an industrial truck or tractor by gripping an edge portion of the pallet and pulling the load and slip sheet onto the supporting surface, and subsequently releasing the grip on the pallet edge and discharging it and the unit load from the supporting surface, have long been known in the art. The load supporting surface must be movable vertically and tiltable forwardly from a horizontal position in order to carry out the slip sheet pallet handling method.

Rider type counterweighted lift trucks having uprights mounted from the forward end have long been used for the handling of loaded slip sheet pallets by means of such push-pull type attachments. A representative push-pull attachment is manufactured by the assignee of this application under the trademark "Pul-Pac", Model B-5. To a limited degree low lift pedestrian or walkie-type transporter trucks have been used heretofore in combination with push-pull type attachments in applications where elevation of the load above a transport position or standard pallet height is not required. Major advantages result from the use of the much lower cost walkie-type truck as compared with a masted rider truck. One such known transporter type truck which is designed to jack-knife centrally thereof in order to tilt the load supporting surface so as to be capable of handling slip sheet palletized loads is Model MTP-WJ, manufactured by Otis Elevator Company of Cleveland, Ohio.

Also known is a prior low lift floor level pick-up truck in which hydraulic actuators are adapted to extend and retract longitudinally of the truck trail wheels which are mounted underneath fork tine members for the purpose of tilting the tines to a load pick-up position when retracted and raising the tines to load carrying position when extended. Such a device is disclosed in U.S. Pat. No. 3,495,730. It is not satisfactory partly because design criteria impose on the trail wheel a permissible design in a given truck design which is not capable of both tilting the fork tines to a floor load level pick-up position and raising the fork tines a distance which will enable them to clear wooden pallets and the like in a vertical direction for engagement, deposit and withdrawal of loads on the pallet.

SUMMARY OF THE INVENTION

My invention provides a powered walkie/rider type low lift transporter truck in which a tractor portion is supported from a drive-steer wheel and elevatable load wheels associated with an elevatable relatively short L-frame. A load handling portion having a relatively long load supporting L-frame is supported on the short L-frame and is coupled to the tractor section by vertical guide means. The long L-frame overlaps and extends forwardly of the short L-frame which elevates the long L-frame in a horizontal plane and which when lowered in a horizontal plane permits the long L-frame to tilt forwardly to form a ramp while the drive tractor portion may remain in a fixed position.

It is a primary object of the invention to improve low lift platform trucks for handling slip sheet pallets.

DESCRIPTION OF THE PREFERRED EMBODIMENT

Figure 1:
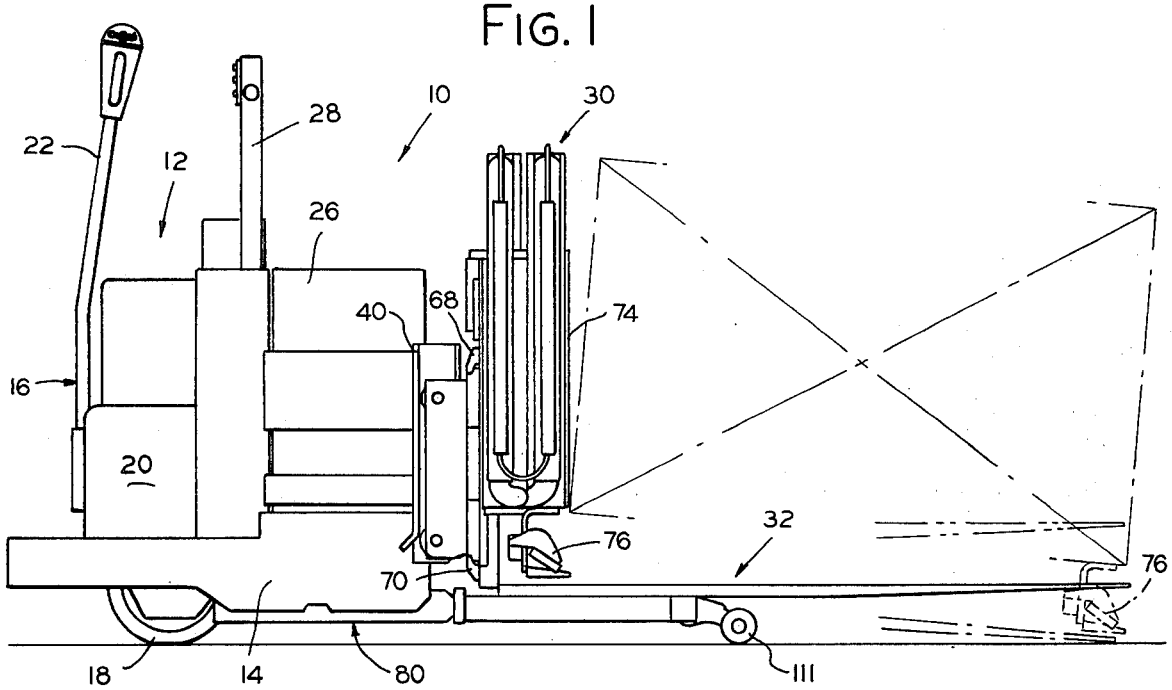
FIG. 1 is a side view in elevation of a low lift truck which embodies my invention.

Referring now to the drawing, a slip sheet low lift transporter truck with push-pull attachment is shown generally at numeral 10 in FIG. 1. The traction drive and control portion of the truck is shown at numeral 12 and utilizes generally the configuration and components of assignee's Walkie/Rider HWP Model. It includes a horizontal platform and frame portion 14 in which is mounted a drive head unit 16 which includes a drive-steer wheel 18 supporting an electric drive motor, reduction gear box, brake and control units contained within a housing 20 and supported and guided by circumferentially spaced rollers connected to the drive head unit which engages a circular track, not shown, supported from the platform frame 14. The drive unit 16 is mounted for rotation about the vertical axis of the wheel and drive head unit for steering the wheel 18, all in known manner. A drive control and steering handle 22 is pivotable in both vertical and horizontal directions for pedestrian operated usage as a walkie truck in driving, steering and braking the truck. Suitable electrical connections, not shown, extend between a storage battery 26 mounted on the forward end of platform 14 and the drive motor, and an additional T-handle control 28 has suitable controls for operating the push-pull attachment shown generally at numeral 30 and for lifting and lowering a long L-frame or platform assembly 32, being mounted so that an operator can drive, steer and control other operations of the truck while located in a standing position on the rear platform thereof and steering with control handle 22 while controlling speed and braking by means of the controls associated with control handle 28, as well as controlling the handling of slip sheet pallets at the front end of the truck.

A pair of outwardly facing vertical guide means comprising upright channel members 40 are secured, as by welding, transversely outwardly of pairs of vertically spaced forwardly extending plate members 42 which contain the sides of the battery 26 and which are connected together at the front ends by a pair of vertically spaced and transversely extending frame members 44 which contain the battery at the front end.

Figure 2:
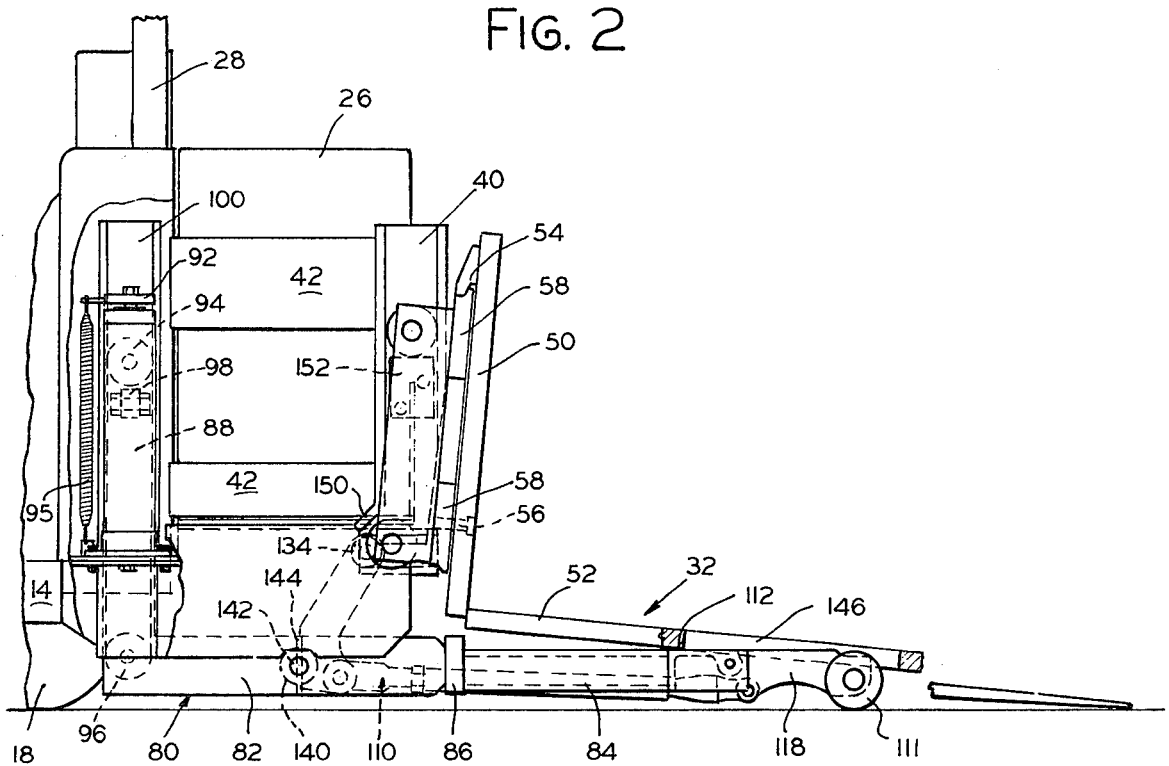
FIG. 2 is an enlarged partial sectional view of a portion of FIG. 1 showing the unit in a lowered position wherein the long L-frame load platform forms a ramp, the tips of which are in contact with the floor for pick-up or discharge of a load from a slip sheet pallet usable with a push-pull attachment.

The generally L-shaped load supporting frame or platform assembly 32 includes a U-shaped vertical plate 50, a relatively long pair of platens or transversely spaced pair of horizontal platform elements 52 secured to opposite side portions of member 50, the latter member having an upper pair of transversely spaced hangers 54 secured to the upper end portions of each leg of member 50 for engaging in known manner a fork bar carriage assembly, as best shown in FIG. 2, which comprises a pair of vertically spaced and transversely extending fork bars 58. Bolts 56 secure the lower portions of plate 50 to lower fork bars 58. Secured across the rear sides of bars 58 is a pair of fork brackets 60, to each of which is mounted upper and lower guide rollers 62 and 64 which engages channels 40 for guiding the vertical and tilting movements of L-frame assembly 32 in a manner to be described.

Figure 5:
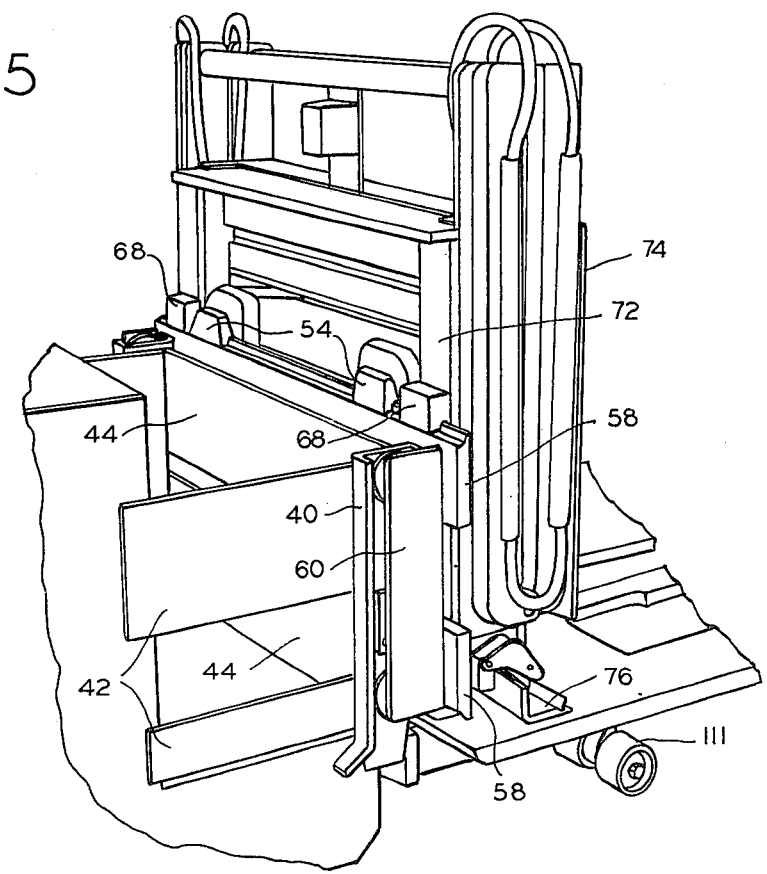
FIG. 5 is a perspective view of the central portion of the truck.

The push-pull attachment device 30 is shown only in FIGS. 1 and 5, being shown in retracted position in solid lines, and diagrammatically extended in broken lines in FIG. 1 with L-frame 32 tilted.

Figure 4:
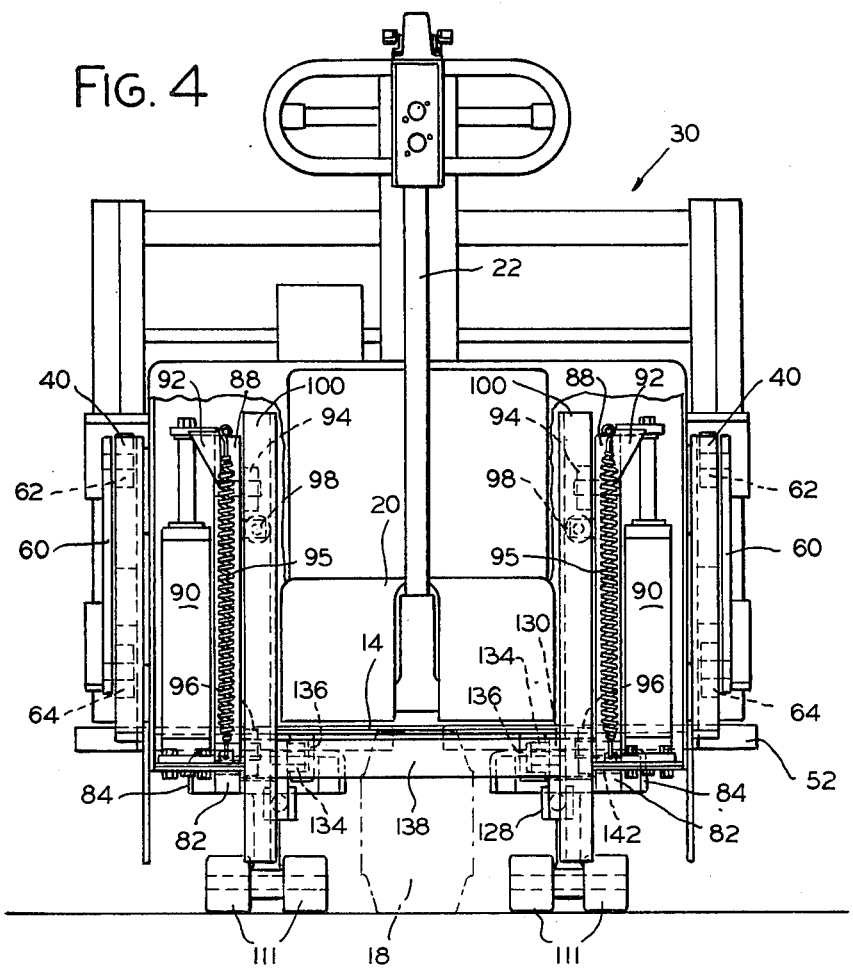
FIG. 4 is a partial sectional view taken from the rear end of the truck as shown in FIG. 1 with the long L-frame shown elevated.

The attachment is not shown in the remaining figures, except in frame outline as seen in FIG. 4, so that the clarity of the drawing is enhanced. As mentioned previously, the attachment may be of assignee's own Model B-5 design, as shown, which is mounted for connection to fork bars 58 in straddling relation to hanger members 54 by pairs of upper and lower hanger and clamp members 68 and 70 which are secured to members of the rear framework 72 of the attachment. The attachment is adapted to be moved at all times in vertical and tilting movements coincident with the similar movements of L-frame assembly 32.

As is well know, in the retracted position shown in FIG. 1 the pantograph unit is collapsed fully, in which position a load pusher rack 74 may be in contact with the one end of a load, not shown, from which has been drawn onto the horizontal platform 52 by gripper jaw unit 76, from the broken line position shown in FIG. 1, the load being palletized on a slip sheet and, for example, drawn onto the platform 52 as the truck is driven forwardly and the attachment is retracted. To push a unit load from the platform, the pantograph unit may be extended forwardly, for example, as the gripper jaw opens automatically and the truck is simultaneously backed, all as is well known.

A generally L-shaped intermediate elevatable frame assembly 80 interconnects drive unit 12 with L-frame and attachment assemblies 30 and 32 for raising and lowering the latter assemblies in relationship to the drive unit, platform 14, the battery 26 and channels 40. The assembly 80 comprises a pair of transversely spaced and forwardly extending L-shaped members having horizontal leg portions 82 connected to transversely spaced horizontal inverted U-shaped platform leg portions 84, which at the adjacent ends are secured together by a transverse brace member 86, and a pair of transversely spaced vertical legs 88 which extend through openings in platform 14 and which are connected to the rod ends of a pair of laterally spaced hydraulic actuator cylinders 90, supported at the head ends from platform 14, by plates and gussets 92 and by a pair of cylinder return springs 95. Leg portions 84 are also secured together by a plate 85 which forms therewith a forwardly extending U-shaped platform.

Vertical legs 88 are connected for vertical guided movement by upper and lower pairs of guide rollers 94 and 96 and by intermediate side thrust guide rollers 98 to a pair of vertical channel members 100 which also extend through and are edge welded to openings in platform 14, a transverse brace member 102 being secured between the upper web portions thereof to provide a generally H-shaped inner fixed vertical frame for supporting and guiding the short L-frame assembly 80.

Figure 3:
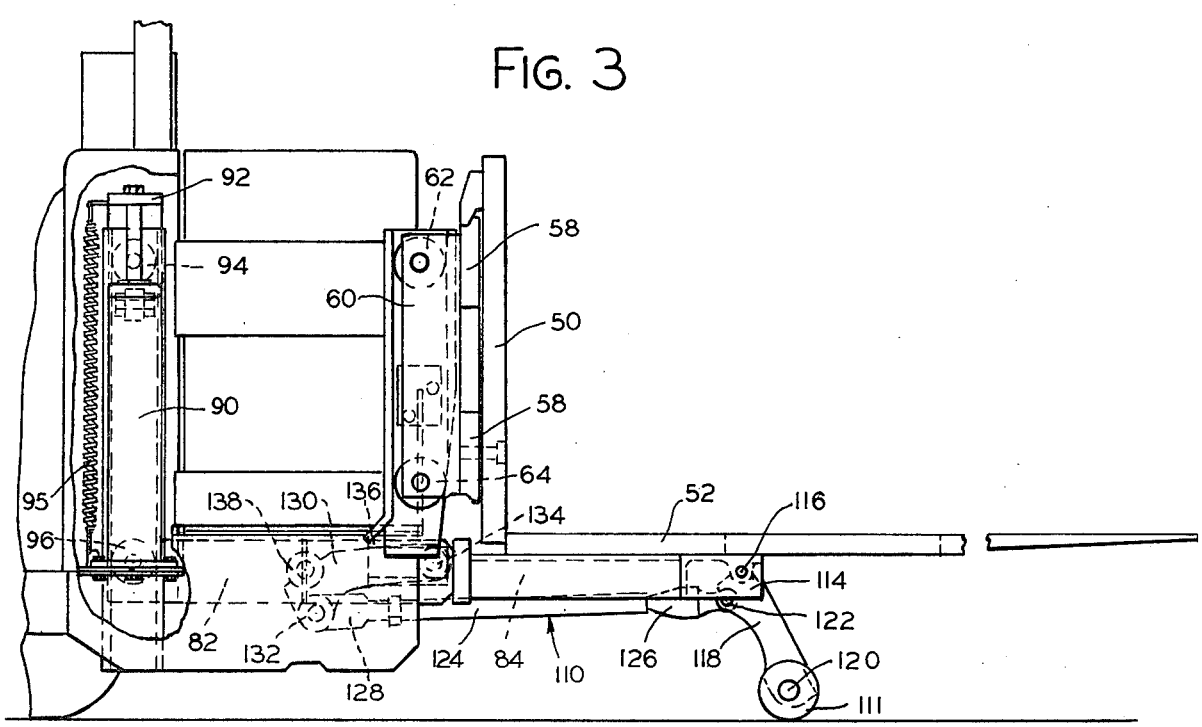
FIG. 3 is similar to FIG. 2 but illustrates the load platform in an elevated position.
Figure 6:
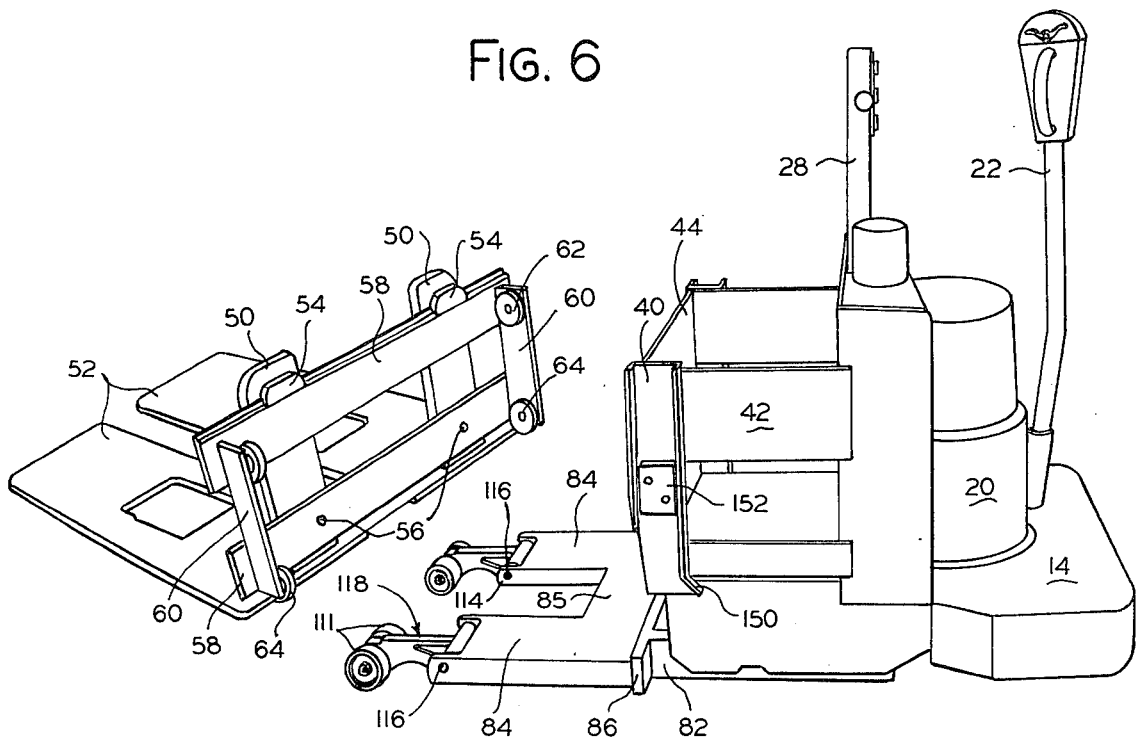
FIG. 6 is a perspective view showing the long L-frame uncoupled from the truck.

A lift linkage assembly shown generally at numeral 110 interconnects pairs of load wheels 111 and L-frame 80 in such a manner as to elevate the L-frame in a horizontal plane during extension of cylinders 90, said L-frame being in continuous supporting engagement with the long load supporting L-frame 32 to elevate the same between the positions shown in FIG. 1 and that shown in FIG. 3, while being also adapted to lower the L-frame 80 such that frame 32 is capable of assuming the ramp position shown in FIG. 2.

L-frame 80 and linkage assembly 110, with an important modification, are similar to the corresponding frame and linkage assembly used in assignee's aforementioned HWP Walkie/Rider Model. Relatively minor modifications adapting the prior design to the present invention comprise the mounting of springs 95 exterior of cylinders 90, rather than interior thereof as heretofore, and the elimination of a fork plate which in the HWP Model extends vertically and forwardly of the battery compartment and is integral with the L-frame. An important modification of the said prior L-frame and lift linkage construction is the use of a relatively short horizontally extending L-frame so that it is possible for the long load supporting L-frame 32 to assume a ramp position, as will be explained more fully below.

As used herein the terms "long" and "short" in relation to the horizontal extent of platforms 80 and 32 are intended to define a relationship between the horizontal legs of the L-frames which permits frame 32 to assume the ramp position shown in FIG. 2 wherein the outer end thereof contacts the load supporting surface or floor while an intermediate portion is supported by the outer end portion of legs 84 as shown at numeral 112.

Each of the inverted U-shaped platform legs 84 has a forwardly extending U-shaped end 114 having openings adapted to receive a pivot pin 116 on which is mounted a lift lever linkage assembly 118 from the outer end of which is mounted on a shaft 120 the pair of load wheels 111, and intermediate the ends of which is secured a pivoted connection 122 of the lift linkage. The lift linkage assembly 110 includes a pair of transversely spaced links 124 having enlarged forward ends 126 and pivotally connected by adjustable yokes 128 at the other ends to the respective one legs of a pair of bellcranks 130 at 132. At the end of the other leg of each bellcrank an inwardly extending guide roller 134 is mounted and is adapted to engage a short facing channel section 136 secured at its upper flange portion to the underside of one side of frame platform 14, the bellcranks being secured, as by welding, to opposite end portions of a transverse torque tube 138 which is also journalled in openings 140 in short L-frame legs 82 at reduced diameter ends 142 and is secured by a transverse pin 144 in each opening 140 such that extension of cylinders 90 from full retraction to maximum extension causes short L-frame 80 to be elevated in a horizontal plane from the position of FIG. 2 to that of FIG. 3 as the motion of bellcrank 130 is guided by channels 136 to retract links 124 causing the load wheels and linkage assemblies 111 and 118 to elevate from the FIG. 2 to the FIG. 3 position. It will be understood that a portion of each link 124 is adapted to nest inside of the respective inverted U-shaped L-frame leg portion 84. The lifting link and bellcrank assemblies are mounted transversely inwardly of each of the vertical legs 88, and of the rear horizontal leg portions 82 of L-frame assembly 80, as best seen in FIG. 4. The purpose of torque tube 138 is, of course, to both rigidify the linkage structure and to insure synchronized lifting movements of the pair of lift linkages. Openings 146 are formed in each long platform leg for the reception of load wheels 82 and a portion of the lift lever 118 when the long L-frame assembly is in a ramp position as shown in FIG. 2.

It will be appreciated that in elevating the short L-frame 80 pressure fluid is directed to cylinders 90 to extend the piston rods and elevate therewith in opposition to springs 95 the L-frame, the vertical legs 88 thereof being guided by rollers 94 and 96 in channels 100 and causing through the operation of torque tube 138 the concurrent elevation of the front end of the L-frame assembly by pairs of load wheels 111 and lift levers and linkages 118 and 124 operated by bellcranks 130 until at maximum elevation the rear portions 82 of the horizontal legs of the assembly abut the underside of frame platform 14, at which position long L-frame assembly 32 and push-pull attachment 30 have been elevated by frame assembly 80 to the FIG. 3 position as pairs of guide rollers 62 and 64 are elevated in guide channels 40. In the FIG. 3 position the long L-frame and carriage assembly 32 with push-pull attachment 30 is elevated for a load deposit or pick-up operation in relation to a slip sheet pallet load on any standard wooden frame pallet, for example.

In order to achieve the ramp position of long L-frame 32 as shown in FIG. 2 I have provided a rearwardly extending open rear flange or camming portion 150 at each channel 40 and a stop block member 152 secured, as by bolts, at a predetermined location in each channel 40 so that with cylinders 90 retracted fully the frame assembly 32 is at its lowermost position with upper rollers 62 abutting block members 152, at which position lower rollers 64 have become disengaged with the rear flanges of channels 40 as they move rearwardly under the force of gravity into the open areas provided by biased flange portions 150. This action permits frame assembly 32 to tilt forwardly into the ramp position of FIG. 2 with the tips of the long platform legs in contact with the floor and preferably supported at 112 by the short L-frame end portion as previously mentioned. In the latter condition, as will be noted in FIG. 2, lower rollers 64 are not in contact with biased flange portions 150, which is preferred. The tilt angle is predetermined mainly by the design relationship between the effective lengths forwardly of fork bars 58 of the horizontal leg portions of the long and short L-frame assemblies, the support of the long L-frame when tilted being at contact areas 112 and between the forward flanges of channels 40, stop blocks 152 and rollers 62. In such position, as previously explained, the push-pull attachment 30 is capable of retrieving onto the long load support platform loads on slip sheet pallets. The openings 146 in the load platform are required so as to maintain the correct wheel base for the desired weight distribution.

It will be noted that in all positions of long L-frame 32, short L-frame 80 remains horizontal (assuming, of course, that the truck is on a horizontal supporting surface), and that the tractor drive end 12 of the truck, including battery 26 and channels 40, is not rquired to articulate, jack-knife, or otherwise alter its fixed relationship to the movable L-frames and lift linkage assembly. When the lifting assembly is elevated from the FIG. 2 position, as above explained, lower rollers 64 will be forced against the biased flange portions 150 as L-frame 32 is elevated at 112 by L-frame 80. Flange portions 150 then function as camming surfaces to cause said rollers to move upwardly and forwardly into the channels as upper rollers 62 are elevated above stop blocks 152, thereby actuating the load support 32 into a position parallel to the floor and resting fully on the forward leg portions of short L-frame 80.

Although I have described and illustrated a preferred embodiment of my invention, it will be understood by those skilled in the art that modifications may be made in the structure, form and relative arrangement of parts without necessarily departing from the spirit and scope of the invention. Accordingly, it should be understood that I intend to cover by the appended claims all such modifications which fall within the scope of my invention.

I claim:

1. In a low lift powered truck, a tractor drive portion having a main frame, hydraulic actuator and guide means supported from and rearwardly of the forward end portion of said frame, vertical guide means supported from a forward end portion of said frame, a relatively short L-frame assembly having a horizontal leg portion extending beneath and forwardly of said main frame and a vertical leg portion actuatable by said hydraulic actuator for guided vertical movement, a pivoted load wheel means and actuator assembly connected to said L-frame assembly and cooperating with said hydraulic actuator means to raise and lower said L-frame bodily vertically, and a relatively long L-frame assembly coupled with said vertical guide means for guided vertical movement in at least a portion of its travel, said long L-frame overlapping, extending forwardly of and elevatable by said short L-frame.

2. A lift truck as claimed in claim 1 wherein said hydraulic actuator and guide means includes other vertical guide means, and said vertical leg portion of said short L-frame extends through the main frame for guided vertical movement in said other vertical guide means.

3. A lift truck as claimed in claim 1 wherein said long L-frame is elevated by said short L-frame in a substantially horizontal plane.

4. A lift truck as claimed in claim 1 wherein said vertical guide means is so constructed as to permit said long L-frame to tilt forwardly out of the plane of said short L-frame upon lowering of said short L-frame.

5. A lift truck as claimed in claim 4 wherein openings are formed in the horizontal leg portion of said long L-frame into which said load wheel means project when said long L-frame is thus tilted.

6. A lift truck as claimed in claim 4 wherein said long L-frame tilts forwardly to form a ramp with the floor, and a push-pull attachment supported from said long L-frame for engaging floor supported slip sheet pallets when said long L-frame is thus tilted.

7. A lift truck as claimed in claim 4 wherein said vertical guide means includes stop means and cam means, said stop means and forward end portion of said short L-frame supporting said long L-frame in said tilted position, and said cam means permitting movement of said long L-frame to said tilted position.

8. A lift truck as claimed in claim 1 wherein said long L-frame is coupled with said tractor drive portion solely in said vertical guide means.

9. A lift truck as claimed in claim 1 wherein said long L-frame engages said short L-frame continuously by the force of gravity, and is coupled with said tractor drive portion solely in said vertical guide means.

10. A lift truck as claimed in claim 9 wherein said vertical guide means is constructed to cooperate with the foward end portion of said short L-frame to support said long L-frame in a forwardly tilted position upon lowering of said short L-frame.

11. A lift truck as claimed in claim 10 wherein said vertical guide means comprises a pair of transversely spaced and outwardly facing channels having stop means located therein and an open rear flange portion, said long L-frame being mounted in said channels by upper and lower transversely spaced pairs of guide rollers which straddle said stop means, tilting of said long L-frame being effected by lowering of the long L-frame with the short L-frame until the upper guide rollers abut said stop means and the lower guide rollers move rearwardly at least partially out of said channels through the rear flange openings thereof.

12. A lift truck as claimed in claim 11 wherein a push-pull attachment means is supported from said long L-frame for engaging slip sheet pallets when said long L-frame is in said tilted position.

13. A lift truck as claimed in claim 1 wherein said vertical guide means comprises a pair of transversely spaced channels, said long L-frame being coupled with said channels by upper and lower pairs of guide rollers which normally effects full surface contact between the overlapping portions of the short and long L-frames during elevation thereof, and means associated with said vertical guide means permitting tilting movement of the long L-frame upon lowering of the short L-frame while said short L-frame remains in a substantially horizontal position and said main frame remains fixed in a vertical direction.

14. A lift truck as claimed in claim 1 wherein said short L-frame is normally in full surface contact with the overlapping portion of said long L-frame during elevation thereof, and means associated with said vertical guide means permitting tilting movement of the long L-frame upon lowering of the short L-frame while said short L-frame remains in substantially horizontal position and said main frame remains fixed in a vertical direction.

15. A lift truck as claimed in claim 13 wherein a drive battery compartment is formed at the forward end of said tractor drive portion, said transversely spaced channels being supported from the opposite forward corner portions of said battery compartment and facing transversely outwardly thereof.

* * * * *